United States Patent [19]

Swanson

[11] Patent Number: 5,496,176

[45] Date of Patent: Mar. 5, 1996

[54] MILITARY STRATEGY MAPPING APPARATUS AND METHOD OF USE

[76] Inventor: Jeffrey A. Swanson, 1777 Ivy Oak Sq., Reston, Va. 22090

[21] Appl. No.: 205,450

[22] Filed: Mar. 4, 1994

[51] Int. Cl.⁶ .................................................. G09B 19/00
[52] U.S. Cl. ............................................. 434/154; 434/11
[58] Field of Search ............................... 434/11, 25, 154, 434/150, 153, 151, 428, 430, 14; 283/34, 35; 273/255, 262

[56] References Cited

U.S. PATENT DOCUMENTS

| 428,899 | 5/1890 | Eggleston | 283/34 |
|---|---|---|---|
| 656,569 | 8/1900 | Osborne | 283/34 |
| 671,855 | 4/1901 | Cummins | 273/255 |
| 972,382 | 10/1910 | Johnson-Jervis | 273/255 |
| 1,292,766 | 1/1919 | Hammond | 273/286 |
| 1,476,671 | 12/1923 | Crate | 283/34 |
| 3,860,241 | 1/1975 | Leftin | 273/134 |
| 4,572,514 | 2/1986 | Aponte | 273/255 |
| 4,800,662 | 1/1989 | Belrose | 40/426 |
| 5,026,069 | 6/1991 | Leask | 273/255 |
| 5,259,763 | 11/1993 | Wendel et al. | 434/150 |

FOREIGN PATENT DOCUMENTS 0000467 of 1872 United Kingdom ..................... 434/11

*Primary Examiner*—Gene Mancene
*Assistant Examiner*—Jeffrey A. Smith
*Attorney, Agent, or Firm*—Henderson & Sturm

[57] ABSTRACT

A method and apparatus (10) for recreating the strategy and maneuvers employed by opposing forces in an actual military engagement as described in a historical text through the placement and movement of different sized military unit markers (40) on the surface of a map (20) in accordance with the narrative contained in the text (100), wherein the different sized military unit markers (40) are adapted to be releasably attached both to the surface of the map (20) and to one another.

10 Claims, 3 Drawing Sheets

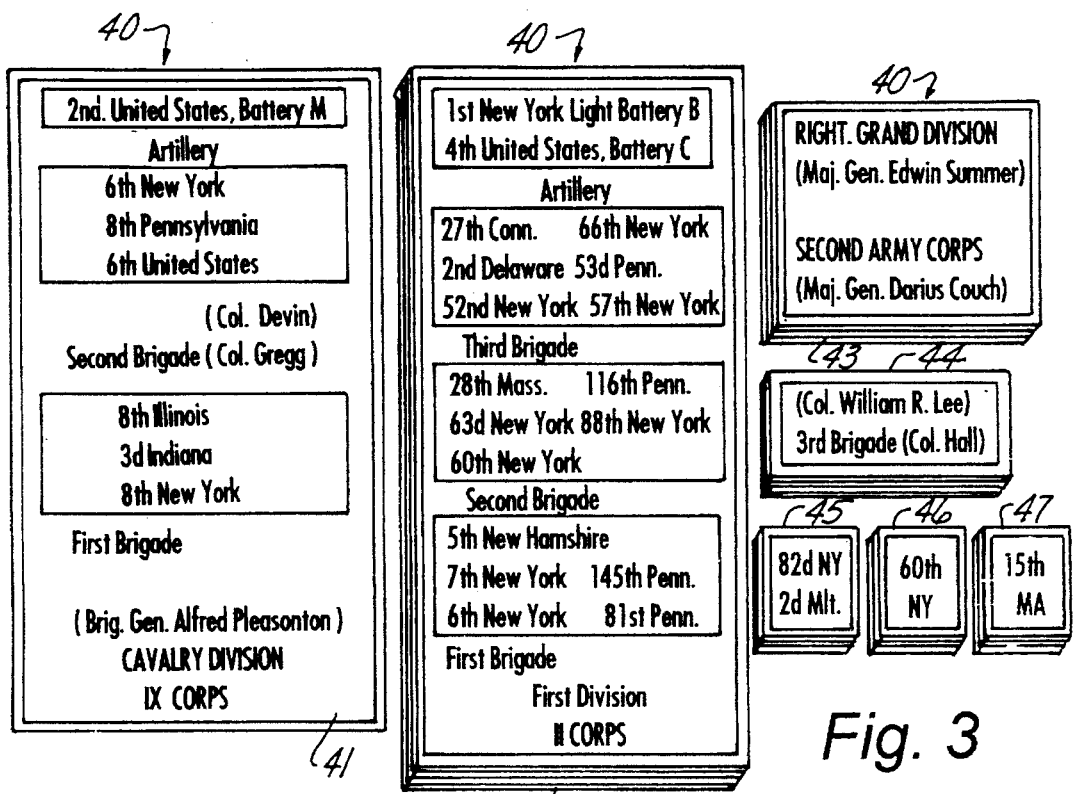
Fig. 2
Fig. 3
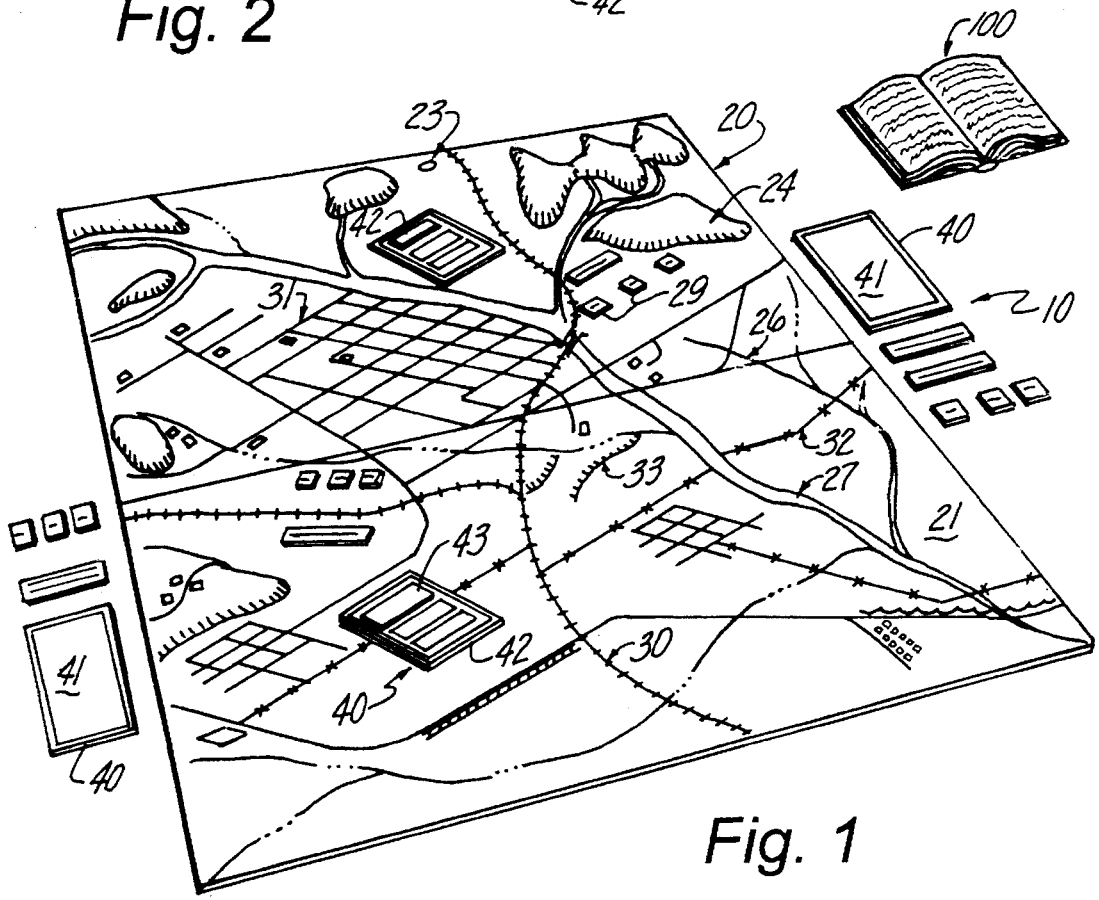
Fig. 1

MILITARY STRATEGY MAPPING APPARATUS AND METHOD OF USE

TECHNICAL FIELD

The present invention relates to the field of military history in general and in particular to a new method and apparatus for precisely duplicating military unit maneuvers of historical battles on historically accurate period maps.

BACKGROUND ART

As can be seen by reference to the following U.S. Pat. Nos. 671,855; 972,382; 1,292,766; and 3,860,241; the prior art is replete with myriad and diverse board game apparatus which simulate military battles according to the laws of chance.

While all of the aforementioned prior art constructions are more than adequate for the basic purpose and function for which they have been specifically designed, these board game apparatus are seriously deficient from the standpoint of serious students of military history because there is no similarity at all between a game of chance and a historical event of military significance.

In addition, students of military history have been handicapped in their ability to understand and follow the maneuvers and progress of individual military units during the course of a single battle, campaign, or war because, to date, no one has provided a method and apparatus with which they could use both a historically accurate map and written military history to track and duplicate the historically accurate maneuvers of military units in a given battle.

Serious students of military history find it extremely difficult and at times impossible to track small unit movements, not to mention medium to large unit movements, while reading written accounts of famous battles, even when those written accounts include printed maps that show the overall large scale directions of advance and retreat of the main bodies of the opposing forces, without additional reference materials and aids.

In addition, when they are interrupted while trying to recreate, track, and understand the unit movements involved in a historical battle, these serious students must often backtrack in order to arrive at and progress beyond the point at which they were interrupted.

These students of military history, therefore, need a new method and apparatus for tracking both large and small scale military unit movements on a historically accurate map while reading a written account of a particular battle, and producing such a method and apparatus is a stated objective of the present invention.

DISCLOSURE OF THE INVENTION

Briefly stated, the apparatus for accurately recreating an actual military engagement as recorded in a historical text comprises the following structural components which are used in conjunction with the narrative text: an enlarged historically accurate map depicting the geographical terrain and man-made features at the site of a military engagement wherein the map is drawn to a specific scale; a plurality of military markers representative of both large and progressively smaller military units wherein the smaller military unit markers are adapted to cooperate in a specific manner both with the relatively larger military unit markers and the map; and a plurality of icons representing various and diverse chronological, meteorological, and militarily significant elements which played a role during the course of the engagement.

As will be explained in greater detail further on in the specification, all of the foregoing structural components are designed and intended to cooperate with one another in a precise, predetermined, and specific manner as set forth in the printed narrative of the historical text, so that a student of military history can use and evaluate the actual maneuvers that were undertaken by even the smallest military unit during the course of the military engagement.

BRIEF DESCRIPTION OF THE DRAWINGS

These and other attributes of the invention will become clearer upon a thorough study of the following description of the best mode for carrying out the invention, particularly when reviewed in conjunction with the drawings, wherein:

FIG. 1 is a perspective view of the apparatus that is used to practice the method taught by this invention to accurately recreate a historical battle;

FIG. 2 is an isolated view of a typical large military marker(s);

FIG. 3 is an exploded perspective view depicting how the different size military markers cooperate with one another;

BEST MODE FOR CARRYING OUT THE INVENTION

Figure 4:
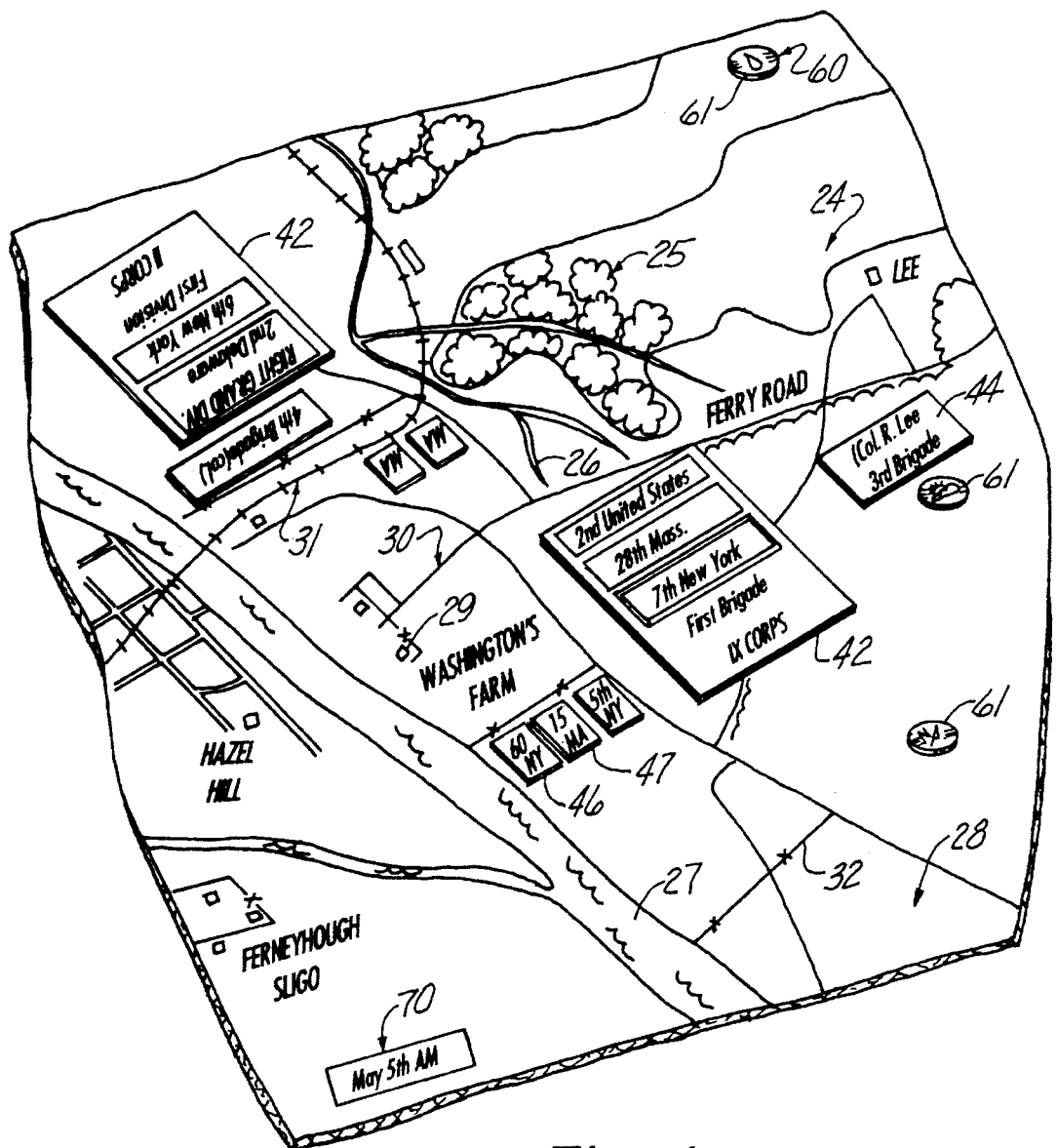
FIG. 4 is an isolated detail view showing how the military markers and icons are deployed on the battlefield map(s); and, FIG. 5 is an isolated view of representative icons that are employed in conjunction with the other structural components that comprise the apparatus.

As can be seen by reference to the drawings and in particular to FIGS. 1 and 4, the apparatus for accurately recreating a military engagement that forms the basis of the present invention is designated generally by the reference numeral (10). The apparatus (10) comprises in general a map (20), a plurality of military unit markers (40), and a plurality of icon markers (60). All are employed in conjunction with a historical text (100). These components will now be described in seriatim fashion.

As shown in FIGS. 1 and 4, the map (20) comprises an enlarged generally flat rectangular map member (21) preferably fabricated from a magnetically attractive material or, in the alternative, made with a magnetically attractive backing (22) formed thereon for reasons that will be explained later in the specification.

In addition, the map member (21) has at least one mounting aperture (23) for suspending the map (20) from a vertical wall surface (not shown) for either display or storage purposes, wherein the map member (21) has sufficient rigidity in its construction so that several maps (20) may be placed in a vertical orientation specifically for instructional purposes or stacked one on top of the other thereby occupying the least possible space during storage.

FIGS. 1 and 4 illustrate that the map member (21) has accurate cartographic representations of both natural geographic terrain features such as hills (24), woods (25), streams (26), rivers (27), and fields (28) and man-made terrain features such as buildings (29), roads (30), railroad tracks (31), fence lines (32), and trenches (33), which are all drawn to scale on the map surface in a well-recognized fashion.

FIGS. 2, 3 illustrate that the military unit markers (40) comprise a plurality of different sized, generally flat rectangular marker members (41) (42) (43) (44) (45) (46). All of the military unit markers (40) coincide with the Order of Battle for the opposing forces involved in the military engagement, and the size of the individual marker (40) is representative of the relative size and strength of the actual military units that it identifies through a printed legend.

In the examples depicted in FIGS. 2, 3, the largest marker member (41) represents an army, the second largest marker member (42) represents an army corps within the army, the third largest marker member (43) represents a division within the corps, and the smaller marker members, (44) (45) (46) represent the smaller to smallest units (i.e., brigade, regiment and company) involved in a historically significant manner in a particular military engagement.

It should also be appreciated at this juncture that the Order of Battle changes from one map (20) to another depending upon the organizational style of the opposing forces and the historical period involved.

As depicted in FIGS. 1 through 4, all of the military unit markers (40) are magnetically attracted both to one another and to the map member (21) for reasons that will be explained in greater detail in this specification.

Figure 5:
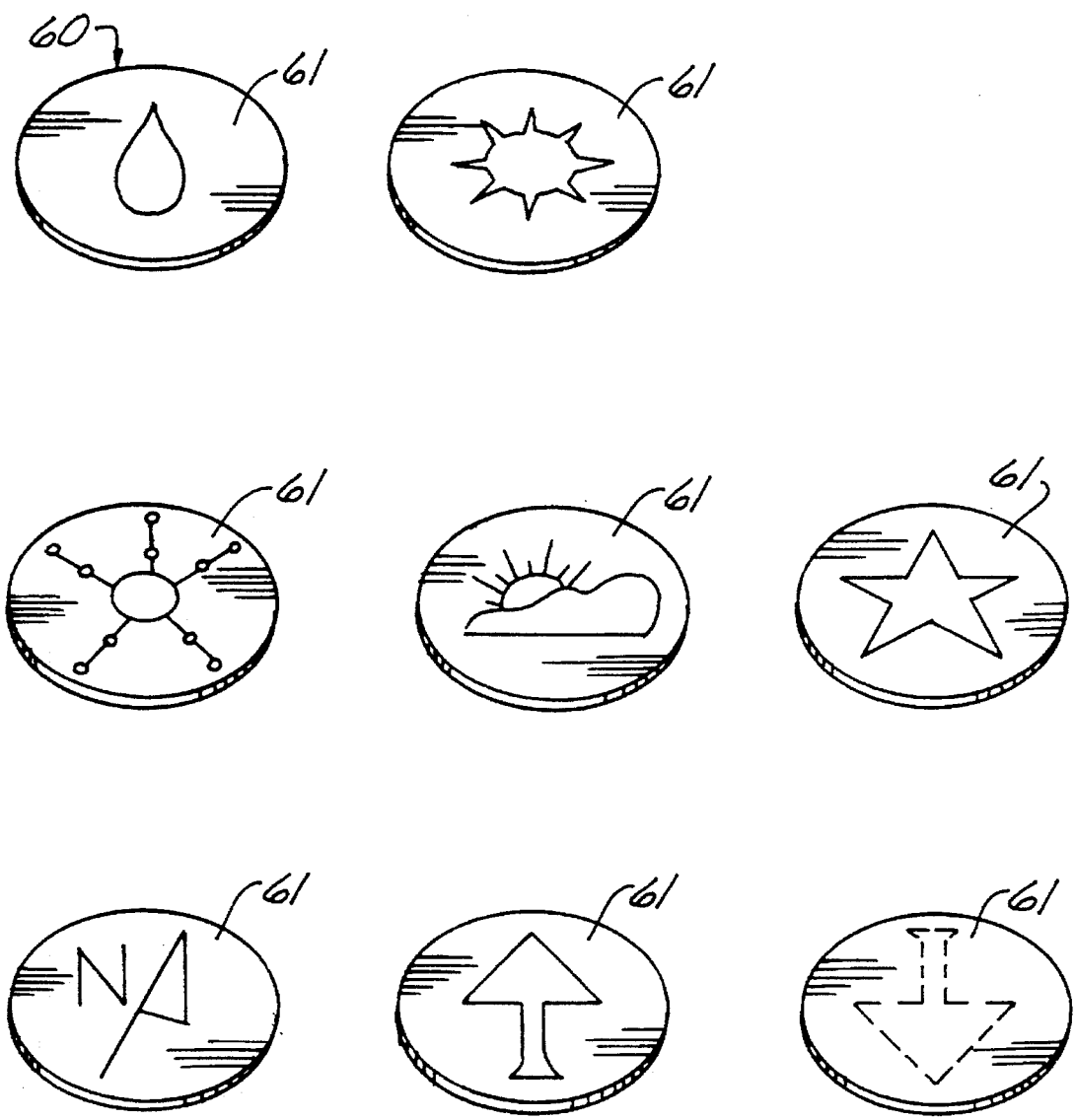

FIG. 5 illustrates the icon markers (60) that comprise generally disk shaped magnetized icon members (61) imprinted with indicia representative of climatological conditions such as wind direction, rain, cloud cover, etc.; tidal conditions when amphibious landings are involved, such as at Normandy and Tarawa; true north orientation; direction of advance/retreat arrows; and command headquarter locations and other important factors that may have played a significant role during a particular military event.

In addition, this invention will also use a chronological marker (70) that can be used to track the individual military unit movements on the basis of historical time. In addition, if users of the apparatus (10) are interrupted in recreation of a military battle, they can use the chronological marker (70) and the chronological information contained on the marker (70) to find their place in the historical text and resume their recreation of the battle.

Not only is the last mentioned feature of great assistance to casual students of military history, but it is also invaluable in a war college environment in which a number of military officers are being taught the relative strategies employed by the opposing forces during actual versus theoretical military engagements. Furthermore, as was mentioned earlier in the specification, the map member (21) has at least one mounting aperture (23) for suspending the map member (21) from a wall, wherein the magnetic characteristics of the military unit markers (40) will maintain those markers (40) in place at their devised location when the map member (21) is disposed in a vertical orientation. This feature is extremely helpful in a teaching environment.

FIGS. 1 and 4 show that the apparatus (10) is utilized by placing the map member (21) on a flat surface. The military unit markers (40) are then deployed in the following manner: The largest military unit markers (41) bearing their magnetically secured related unit markers [(42) (43) etc.] are positioned on the map member (21) so that the largest unit markers (41) are generally centrally located relative to the deployment of the individual unit markers which comprise the individual commands. The next largest unit markers (42) are then deployed proximate to those cartographic features on the map member (21) that are described in the historical military text (100), and this process continues until the smaller and smallest military unit markers (40) are deployed at the exact map locations as described in the text.

In essence, there is an inverse relationship between the size of the military unit markers (40) and the accuracy of their placement on the map member (21), wherein the precision of placement of a particular unit marker decreases as the size of the military unit marker increases. Because of this particular relationship, the student of military history can observe the course of a particular battle on both a macroscopic and microscopic scale.

The user then employs the historical text (100) and the chronological marker (70) to move the military unit markers (40) in a historically accurate manner so that the student of military history can accurately recreate the maneuvers and strategy employed by the opposing forces during a particular battle or campaign.

As was also mentioned earlier, selective icon markers (61) will be magnetically secured to the map member (21) as dictated by the narrative text of the military history book (100) so that the student of military history will be cognizant of all of the factors that influenced the course of a particular military engagement.

By employing the apparatus in this manner the user can obtain a true appreciation of how and why events transpired to produce a victory for one of the opposing forces while resulting in defeat for the other opposing force.

Having thereby described the subject matter of the present invention, it should be apparent that many substitutions, modifications, and variations of the invention are possible. It is, therefore, to be understood that the invention as taught and described herein is only to be limited to the extent of the breadth and scope of the appended claims.

I claim:

1. An apparatus for allowing a student of military history to gain a true appreciation of the strategy and maneuvers actually employed by opposing forces during the course of a military engagement as recorded in a historically accurate military text, wherein the apparatus comprises:

a map comprising an enlarged generally flat rectangular map member provided with accurate to scale cartographic representations of both natural and man made terrain features; and a plurality of military unit markers comprising a plurality of different sized generally flat rectangular marker members, wherein the relative size of the individual military unit markers are representative of the relative size and strength from a manpower and armament standpoint of the actual military units that are identified on the marker members through a printed legend and wherein said marker members are adapted to be movably deployed on said map member.

2. The apparatus as in claim 1, wherein the plurality of different sized marker members are each provided with means for releasably securing said marker members to one another.

3. The apparatus as in claim 1, wherein the plurality of different sized marker members are provided with means for releasably securing said marker members to said map member.

4. The apparatus as in claim 1, wherein the plurality of different sized marker members are provided with means for releasably securing said marker members both to one another and to said map member.

5. The apparatus as in claim 1, wherein said map member is provided with means for suspending the map member from a vertical wall.

6. The apparatus as in claim 1, further comprising:

a plurality of icon markers comprising generally disk shaped icon members imprinted with various indicia representative of diverse factors that had an impact on the military engagement described in the historical text.

7. The apparatus as in claim 1, further comprising:

a chronological marker bearing indicia representative of the historical time period during which a particular military engagement took place.

8. A method for recreating the strategy and maneuvers of the various military units employed by the opposing forces in an actual military engagement as described in a historically accurate text by employing a map in conjunction with different sized military unit markers and various icons according to the step of:

a) placing the different sized military unit markers on the map in accordance with the description of the deployment of the military units as described in the historical text, wherein the smaller the size of the military unit marker the closer the position of the said marker is to the location as described in the text and depicted on the map.

9. The method as in claim 8, further comprising the step of:

b) moving the different sized military unit markers on the map in accordance with both the descriptive text and the relative placement of the military unit markers as set forth in step a).

10. The method as in claim 9, further comprising the step of:

c) placing selected ones of said various icons on the map to represent factors that influenced the movement of the opposing forces as described in the text.

* * * * *